United States Patent [19]

Clausen

[11] Patent Number: 5,797,575
[45] Date of Patent: Aug. 25, 1998

[54] VEHICLE SEAT LOCKING SYSTEM

[75] Inventor: Edvin List Clausen, Tønder, Denmark

[73] Assignee: Norsk Hydro A.S., Oslo, Norway

[21] Appl. No.: 591,555

[22] PCT Filed: Jul. 11, 1994

[86] PCT No.: PCT/NO94/00124

§ 371 Date: Apr. 10, 1996

§ 102(e) Date: Apr. 10, 1996

[87] PCT Pub. No.: WO95/02520

PCT Pub. Date: Jan. 26, 1995

[30] Foreign Application Priority Data

Jul. 12, 1993 [NO] Norway .................................. 932534

[51] Int. Cl.[6] ........................................ A47G 29/02
[52] U.S. Cl. ................................. 248/429; 296/65.1
[58] Field of Search ........................... 248/424, 429, 248/430; 296/65.1; 297/344.1, 344.13

[56] References Cited

U.S. PATENT DOCUMENTS

| 4,168,051 | 9/1979 | Terada | 248/429 |
|---|---|---|---|
| 4,209,159 | 6/1980 | Becker | 248/430 |
| 4,378,101 | 3/1983 | Kazaoka | 248/430 |
| 4,580,755 | 4/1986 | Rees | 248/424 |
| 4,909,469 | 3/1990 | Nihei | 248/429 |
| 4,958,799 | 9/1990 | Clauw et al. | 248/430 |
| 5,028,028 | 7/1991 | Yamada et al. | 248/430 |
| 5,048,787 | 9/1991 | Saitoh | 248/430 |
| 5,167,393 | 12/1992 | Hayakawa et al. | 248/430 |
| 5,285,993 | 2/1994 | Kamata | 248/429 |
| 5,516,071 | 5/1996 | Miyauchi | 248/430 |
| 5,676,341 | 10/1997 | Tarusawa et al. | 248/430 |

FOREIGN PATENT DOCUMENTS

| 685372 | 4/1964 | Canada | 248/430 |
|---|---|---|---|
| 858 362 | 10/1952 | Germany . | |
| 2 254 557 | 5/1974 | Germany . | |
| 34 14 649 | 4/1988 | Germany . | |

*Primary Examiner*—Ramon O. Ramirez
*Assistant Examiner*—Gwendolyn W. Baxter
*Attorney, Agent, or Firm*—Wenderoth, Lind & Ponack, L.L.P.

[57] ABSTRACT

A vehicle seat locking and adjustment system includes a first rail to be connected to a vehicle floor and a second rail to be connected to a vehicle seat. Each of the rails has a wall having therein respective apertures. The second rail is slidably mounted on the first rail with the walls adjacent each other. The first rail has extending along the entire length thereof a fastening structure that is formed unitarily and in one piece with the first rail. The tiltable anchoring member is fastened to the fastening structure and is pivotable relative to the first rail between positions locking the two rails together and unlocking the two rails so that the second rail can slide relative to the first rail.

17 Claims, 3 Drawing Sheets

VEHICLE SEAT LOCKING SYSTEM

BACKGROUND OF THE INVENTION

The present invention relates to a vehicle seat locking and adjustment system typically employed on the front seats of personal vehicles.

A number of different seat locking and adjustment systems are presently known and employed in vehicles. However, all the presently known systems are characterized by a high degree of complexity (many components) and application of several different materials. Thus, such systems are heavy and also are expensive due to laborious manufacturing and assembling operations.

SUMMARY OF THE INVENTION

It is therefore an object of the present invention to provide a simplified and light weight seat locking/adjustment system avoiding the above drawbacks.

This and other objects are achieved in accordance with the present invention by provision of a simplified and inexpensive seat locking and adjustment system.

BRIEF DESCRIPTION OF THE DRAWINGS

Other objects, specific features and advantages of the present invention will be apparent from the following detailed description of preferred embodiments with reference to the accompanying drawings, wherein.

DETAILED DESCRIPTION OF THE INVENTION

Figure 1:
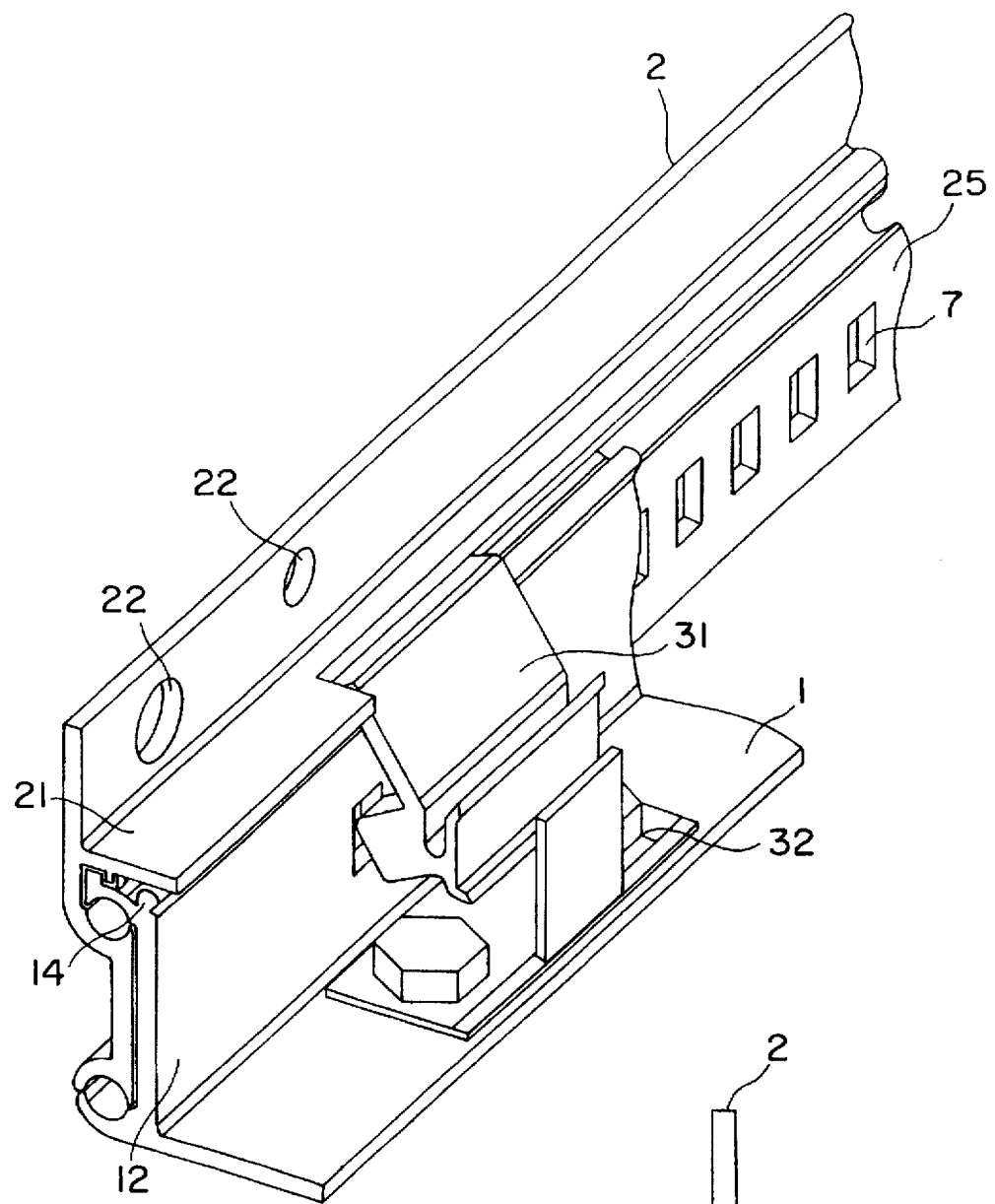
FIG. 1 is a perspective schematical side view of a system of the present invention.

Referring to the drawings and particularly to FIG. 1, a vehicle locking/adjustment system of the invention includes a first rail 1 customarily fastened to the vehicle floor (not shown) and a slideably attached second rail 2 provided with apertures (fastening means) 22 for attachment of a seat and safety belt. An integral coextruded flange for an end stop 21 extends perpendicularly along a predetermined longitudinal extension of the second rail and defines a range of travel of the second rail by abutting a tiltable locating or anchoring member 31. A number of complementary shaped apertures 7 are provided in adjacent walls 12 and 25 of the first and second rails, respectively, and are designed to be engaged by the tiltable locating member 31. The tiltable member itself is anchored by grasping around a fastening structure in the form of a protrusion 14 formed unitarily with (extruded with) wall 12 of the first rail 1.

Figure 2:
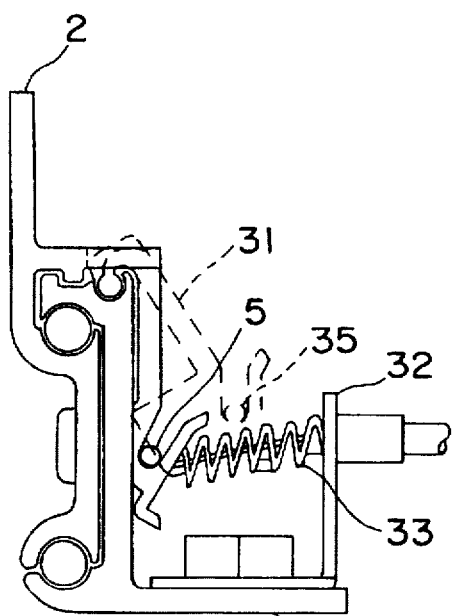
FIG. 2 is a schematic end view showing locking means of the system.

FIG. 2 is an end view showing schematically in more detail the principle of interlocking between the rails 1 and 2. The tiltable locating member 31 is shown in unlocking and locked positions depicted respectively by hatched and solid lines. Member 31 is moved and held in the locked position by means of a conventional cable guided (controlled) spring 33 provided as part of stationary locking means 32 mounted on first rail 1. According to a particularly advantageous embodiment, the tiltable locating member 31 is extruded with a groove 35 providing accommodation and attachment of guiding cable 5.

Figure 3:
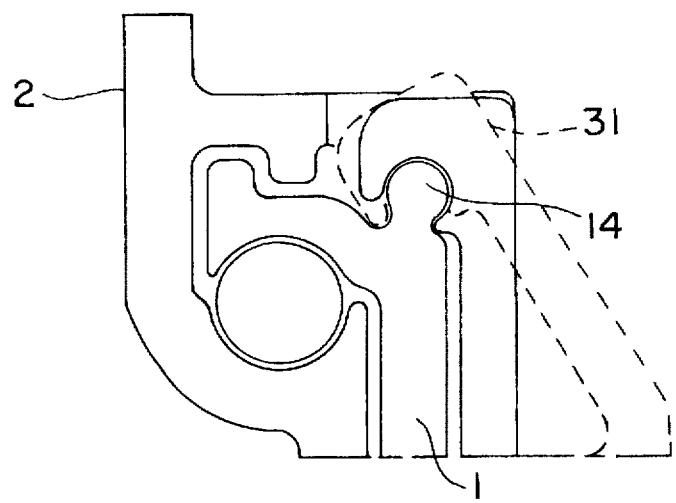
FIG. 3 is an enlarged fragmentary cross-sectional view illustrating the manner of fastening the pivotally anchored locking means.

FIG. 3 illustrates in an enlarged fragmentary cross-sectional view the manner of fastening to enable pivotal movement/anchoring of the locating member 31 onto protrusion 14 formed integrally and in one piece with first rail 1. Member 31 has a recess into which fits protrusion 14.

Figure 4:
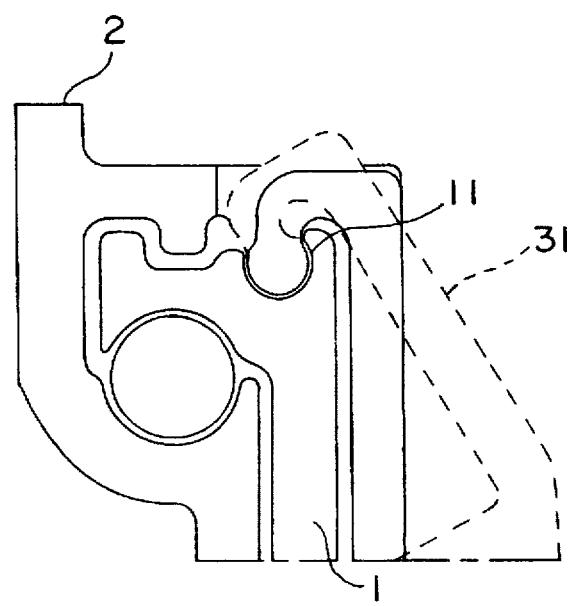
FIG. 4 is an enlarged fragmentary cross-sectional view of an alternative way of anchoring the locking means.

FIG. 4 illustrates an alternative fastening arrangement to achieve pivotal movement/anchoring of the locating member 31 on rail 1. Thus, member 31 has a portion, e.g. a protrusion, fitting into a fastening structure in the form of a groove 11 integrally provided in the first rail 1.

Figure 5:
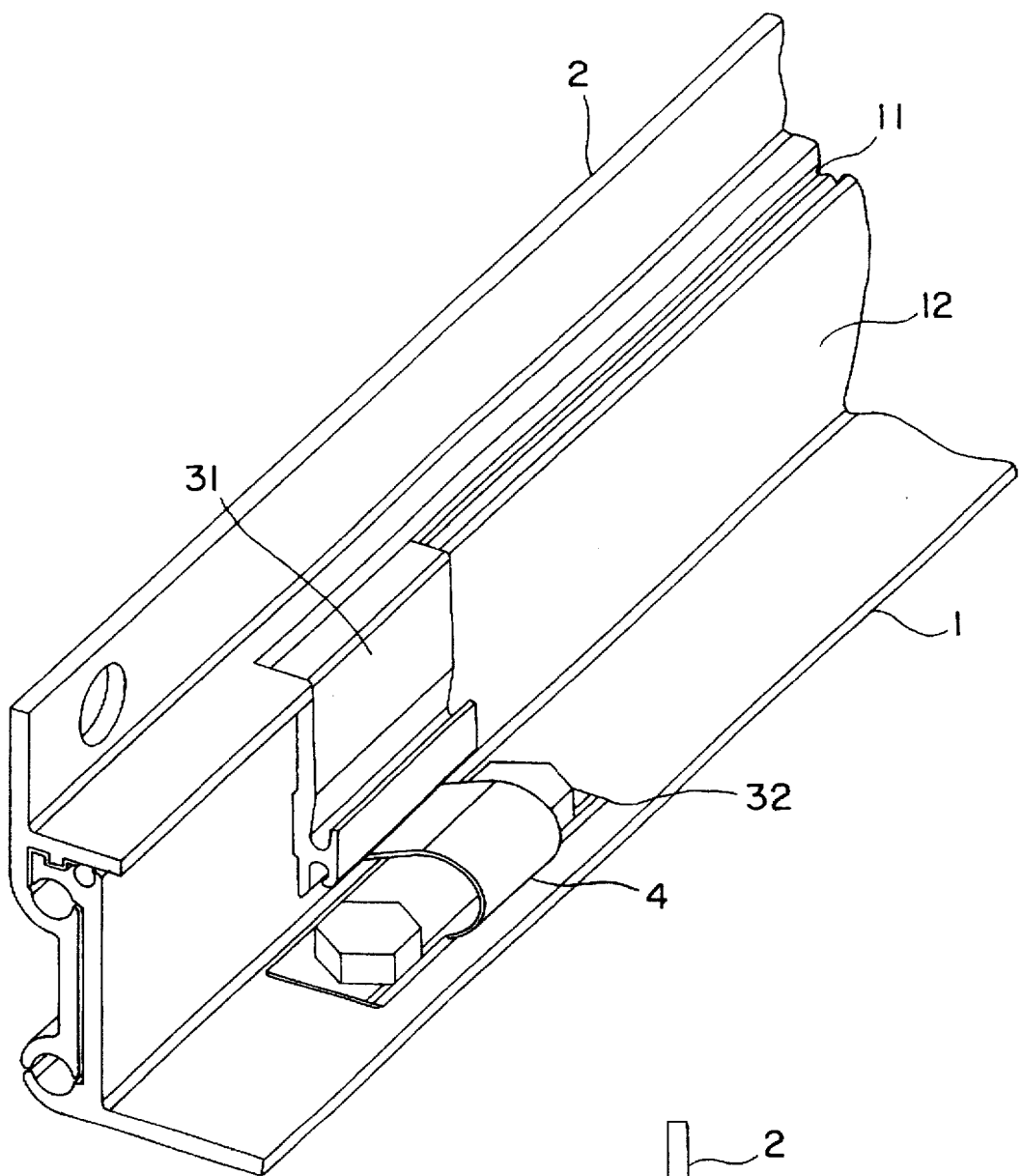
FIG. 5 is a perspective side view of another embodiment of the system.
Figure 6:
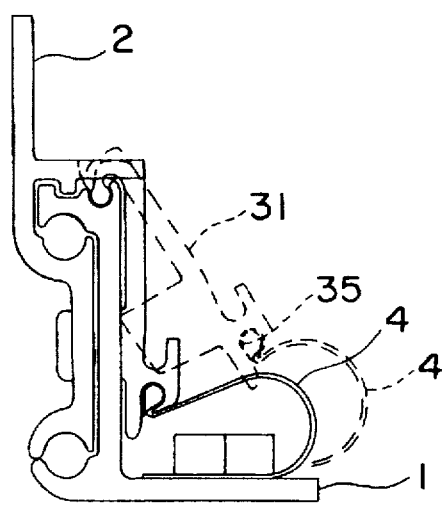
FIG. 6 is a vertical cross-sectional view of the system of FIG. 5.

Another employable embodiment of the locking means is shown in FIG. 5. The rails 1, 2 are interlocked by means of tiltable locating member 31 pivotally attached to the first rail 1 by anchoring into a slot or groove 11. A leaf spring 4 is employed to achieve locking, rather than the cable guided spiral spring of FIG. 2. As can be seen from FIG. 6, illustrating in more detail the leaf spring arrangement 4 shown in a cross-sectional vertical view, the tiltable locking member 31 has a coextruded longitudinal groove 35 that holds the spring in position.

As will appear from the above description of employable embodiments of the present invention, the new locking adjustment system, based on a guiding function and fastening means being integrated in a special and inventive design of the seat rail components, offers a simplified construction that eliminates the need for special/individual stop brackets, etc., thus reducing the number of system components. Furthermore, in a particularly advantageous embodiment of the locking/adjustment system, all components are provided as extrusions made of aluminum or Al-alloys. This solution offers a possibility inherent in the extrusion technique to "tailor" an integral design of the rails with all details resulting in a weight reduction of the system.

The above discussion has been related to the specific embodiments of the system as illustrated by the accompanying drawings. It is, however, contemplated that the present invention is equally applicable to other configurations and embodiments, and various changes and modifications may be made to the specifically described and illustrated arrangements without departing from the scope of the present invention.

I claim:

1. A vehicle seat locking and adjustment system comprising:

a first rail to be connected to a vehicle floor, said first rail having a wall, and said first rail having extending along the entire length thereof a fastening structure that is formed unitarily and in one piece with said first rail;

a second rail to be connected to a vehicle seat, said second rail having a wall;

said walls of said first and second rails having therein respective apertures;

said second rail being slidably mounted on said first rail with said walls adjacent each other; and a tiltable anchoring member fastened to said fastening structure and being pivotable relative to said first rail between a locked position whereat said first and second rails are locked relative to each other by said tiltable anchoring member interacting with said apertures in said walls of said first and second rails, and an unlocked position, whereat said tiltable anchoring member is withdrawn from said apertures such that said second rail is slidable relative to said first rail.

2. A system as claimed in claim 1, wherein said fastening structure comprises a protrusion extending from said first rail.

3. A system as claimed in claim 2, wherein said protrusion extends from said wall of said first rail.

4. A system as claimed in claim 2, wherein said protrusion fits into a groove in said tiltable anchoring member.

5. A system as claimed in claim 4, wherein said tiltable anchoring member comprises an extrusion having said groove extending along the entire length thereof.

6. A system as claimed in claim 2, wherein said first rail and said protrusion comprise a unitary and one piece extrusion.

7. A system as claimed in claim 1, wherein said fastening structure comprises a groove formed in said first rail.

8. A system as claimed in claim 7, wherein said groove is formed adjacent said wall of said first rail.

9. A system as claimed in claim 7, wherein said tiltable anchoring member has extending therefrom a protrusion fitting into said groove.

10. A system as claimed in claim 9, wherein said tiltable anchoring member and said protrusion comprise a unitary and one piece extrusion.

11. A system as claimed in claim 7, wherein said first rail comprises a one piece extrusion having said groove extending along the entire length thereof.

12. A system as claimed in claim 1, wherein said second rail has extending therefrom a stop flange limiting a range of sliding movement of said second rail relative to said first rail.

13. A system as claimed in claim 12, wherein said second rail and said stop flange comprise a unitary and one piece member.

14. A system as claimed in claim 1, wherein said tiltable anchoring member has therein a groove for attachment of a control cable.

15. A system as claimed in claim 1, wherein said tiltable anchoring member has a groove or flange for attachment of a leaf spring.

16. A system as claimed in claim 1, wherein said first rail, said second rail and said tiltable anchoring member comprise respective extrusions formed of light metal.

17. A system as claimed in claim 1, wherein said tiltable anchoring structure has a portion urged toward abutment with said wall of said first rail when said tiltable anchoring structure is in said locked position.

* * * * *